United States Patent Office 3,035,100
Patented May 15, 1962

3,035,100
PROCESS FOR THE PURIFICATION OF NITROCYCLOHEXANE
Arthur F. Kirby and Robert A. Smiley, Woodbury, N.J., assignors to E. I. du Pont de Nemours and Company, Wilmington, Del., a corporation of Delaware
No Drawing. Filed Mar. 25, 1960, Ser. No. 17,482
10 Claims. (Cl. 260—644)

The present invention relates to obtaining purified nitro derivatives of saturated hydrocarbons.

One of the most important members of the class of nitrated saturated hydrocarbons is nitrocyclohexane. Nitrocyclohexane not only is a useful solvent but also is a valuable chemical intermediate, particularly for cyclohexanone oxime, which in turn is an important caprolactam and polyamide precursor. Nitrocyclohexane is prepared by the reaction of cyclohexane with nitric acid, the higher oxides of nitrogen, metal nitrates, or combinations of these nitrating agents, generally by liquid-phase procedures. To achieve good yields of nitrocyclohexane, i.e., to minimize formation of higher nitration products and other by-products, the nitration is usually stopped when not more than about 50 percent of the cyclohexane present has been converted. The acid phase and the nitrocyclohexane-containing organic phase of the resultant nitration mixture then are separated and the organic phase washed to remove traces of dissolved nitrating agent and other water-soluble impurities, i.e., to provide an essentially nonaqueous organic nitration product. However, in spite of careful nitration procedures, the organic phase contains not only the desirable nitrocyclohexane and unconverted cyclohexane but also several by-products which are objectionable or even deleterious in the further processing and use of the nitro compound. By-products which have been found in the organic phase of crude cyclohexane nitration products include such compounds as dinitrocyclohexane isomers, 1-nitrocyclohexene, cyclohexyl nitrite and nitrate, cyclohexanol, cyclohexanone, and depending on the source of the cyclohexane used in the nitration, nitrated methylcyclopentane and dimethylpentanes.

It has been proposed to recover nitrocyclohexane of high purity from the essentially nonaqueous organic phase of cyclohexane nitration products by first removing the major portion of the cyclohexane, e.g., by evaporation, and then subjecting the remaining material to vacuum fractionation. However, very careful fractionation is necessary to obtain nitrocyclohexane of high purity in high yields and such vacuum fractionation also can be dangerous. The distilland remaining after the more volatile components, including the major nitrocyclohexane fractions, have distilled contains one or more thermally unstable compounds of an undetermined nature. Thus, the hot distillation residues can decompose violently and have on several occasions, even when no air was present in the distillation still.

Moreover, aside from the foregoing disadvantages, even careful fractionation of an organic cyclohexane nitration product generally does not give nitrocyclohexane of satisfactory purity for reduction by catalytic hydrogenation. Certain impurities, even when present in the nitrocyclohexane in very low concentrations, have the effect of preventing the reduction altogether or of materially reducing the rate of reduction. The exact nature of these impurities and the mechanism by which they inhibit or prevent the catalytic reduction are unknown.

We have found that nitrocyclohexane which is of high purity and is readily reducible by catalytic hydrogenation can be obtained safely and in high yield by a process having as an essential feature the intimate contacting of impure nitrocyclo hexane dissolved in an organic solvent with sulfuric acid containing a maximum of 35% by weight of water, calculated on the basis of 100% sulfuric acid, the solvent being chemically inert to and essentially immiscible with the acid. We prefer to use as the source of the impure nitrocyclohexane the essentially nonaqueous liquid organic products of incomplete nitration of cyclohexane described heretofore. However, it also is to be understood that for purposes of the present invention impure nitrocyclohexane which has been separated conventionally from the bulk of the unreacted cyclohexane in such an organic nitration product and thereafter dissolved in fresh cyclohexane or another organic solvent which is chemically inert to and essentially immiscible with sulfuric acid is an entirely equivalent and suitable starting material. In the intimate contacting, most of the impurities associated with the nitrocyclohexane will be extracted into the acid; the proportion of nitrocyclohexane extracted into the acid will depend on the amount and concentration of the sulfuric acid and the amount and type of organic solvent used. Nitrocyclohexane is only slightly soluble in sulfuric acid containing 14% by weight or more of water. Hence, if the acid used in the intimate contacting step either contains at least 14% by weight of water or contains less than 14% but subsequent to the contacting is diluted to a water content of 14% or more, most of the nitrocyclohexane will remain in or move to the organic phase; the impurities will remain in the acid phase. Alternatively, when the acid used in the contacting contains less than 14% by weight of water, preferably 8% or less of water, the nitrocyclohexane will remain as part of the acid phase and is thereafter separated from the acid phase by water dilution.

The purified nitrocyclohexane recovered from the organic phase, for example, by evaporation of the organic solvent, or from the acid phase, for example, by decantation after dilution, may, if desired, be subjected to fractional distillation for additional purification, depending upon the use to which it is to be put. For example, if the purified nitro compound is to be subjected to catalytic hydrogenation, such fractionation generally is desirable. However, we also have discovered a procedure by means of which we can avoid this fractionation even when the nitrocyclohexane is to be reduced, e.g., to cyclohexanone oxime, by catalytic hydrogenation. In this embodiment, prior to the treatment with sulfuric acid, the solution of impure nitrocyclohexane in the organic solvent is subjected to intimate contacting with a minor proportion of aqueous inorganic base, particularly dilute aqueous alkali metal hydroxide.

The present improved process for recovering purified nitrocyclohexane suitable for a variety of applications and particularly for conversion to cyclohexanone oxime by catalytic hydrogenation is operable over a wide range of conditions, as will be apparent from the specific but nonlimiting embodiments illustrated in the following examples. For example, the sulfuric acid treatment and/or the treatment with inorganic base may be repeated. Likewise, the concentrations of the acid and base may be varied in such multiple purification procedures. The parts mentioned in the examples are parts by weight, except as otherwise noted.

*Example 1*

Five hundred (500) parts of the oily organic phase of a product obtained by liquid-phase nitration of cyclohexane with nitric acid of about 60% concentration was found by analysis to contain approximately 120 parts of nitrocyclohexane. This crude product was charged to a three-necked flask of suitable capacity fitted with a thermometer, a stirrer, and an addition funnel, through which 125 parts of 96% sulfuric acid then was added over the course of about two minutes. The temperature of the resulting solution was maintained at about 25° C. during this addition and for an additional ten minutes by rapid stirring and external cooling as needed. Thereafter 15 parts of water was added with stirring and cooling as needed to give a final theoretical acid concentration of 86 percent (i.e., based on the acid originally added), and the mixture was allowed to stratify. The aqueous and organic phases formed were separated by decantation, and the organic layer was washed successively with 125-part portions of water, 5% aqueous sodium carbonate solution, and water to remove traces of acid. The washed organic layer was topped at atmospheric pressure through a 10-inch Vigreaux column to remove the major portion of the cyclohexane contained therein and then distilled at 15 mm. Hg until the temperature of the still contents reached 120° C. The nitrocyclohexane which distilled over was collected as follows: a first fraction of material boiling at 70 to 88° C. and amounting to about 28 parts and a second fraction of material boiling at 88° C.; this latter fraction was arbitrarily collected in two parts, the first amounting to about 41 parts and the second to about 46 parts. Thus, the nitrocyclohexane recovered in the three fractions amounted to approximately 95 percent of that in the crude nitration product.

In order to test the purity of these nitrocyclohexane fractions in terms of their suitability for hydrogenation, they each were subjected to the following catalytic hydrogenation procedure for conversion to cyclohexanone oxime. An autoclave which had a capacity of 300 parts by volume and was fitted with an agitator was charged with approximately 0.25 mole of nitrocyclohexane, palladium-on-acetylene black catalyst containing about 5% of palladium and 1% of magnesium as promoter (both on a dry basis) in an amount of provide 500 parts of palladium per million parts of nitrocyclohexane charged, and a 0.2% aqueous solution of lead acetate trihydrate in an amount to provide 3.85 parts of lead per part of palladium charged. Hydrogen then was introduced to a pressure of 450 p.s.i.g., and the autoclave was heated to 150° C. Agitation was started and was continued until hydrogen uptake ceased, i.e., until no further drop in pressure occurred. (This procedure and the preparation of the catalyst used are described in greater detail in co-pending application Serial No. 789,477, filed January 28, 1959, now U.S. Patent 2,967,200 issued January 3, 1961, in the names of R. E. Foster and A. F. Kirby.) The period of time which elapsed from attainment of the reaction temperature to the cessation of hydrogen consumption was recorded as the reduction time, inasmuch as the cessation of hydrogen uptake had been found to indicate essentially complete reaction of the nitrocyclohexane. For comparison, a nitrocyclohexane fraction (B.P. 88° C. at 15 mm. Hg) which had been obtained by fractionation of the crude organic phase of a cyclohexane nitration product without prior treatment with sulfuric acid was subjected to hydrogenation under the same conditions, and the time needed for complete reduction was also recorded in this case. The results were as follows:

| Sulfuric acid-treated NCH [1] fractions | Reduction time (minutes) |
|---|---|
| 1. B.P. 70°–88° C./15 mm | 17 |
| 2. B.P. 88° C./15 mm | 10 |
| 3. B.P. 88° C./15 mm | 18 |
| Untreated NCH fraction, B.P. 88° C./15 mm | 86 |

[1] NCH = Nitrocyclohexane.

*Example 2*

The general procedure of Example 1 was used in the following experiments. For convenience, only the reduction time of a fraction boiling at 88° C. at 15 mm. Hg was determined in each case. The time indicated in the table is the period between completion of the addition of the sulfuric acid and the adjustment of the acid concentration to the final value indicated, or when no final adjustment of concentration was used, between completion of the sulfuric acid addition and cessation of agitation to permit stratification.

| Expt. No. | Initial $H_2SO_4$ concn. (percent) | Weight ratio $H_2SO_4$ (100%)/NCH [1] | Temp. (°C.) | Time (min.) | Theoretical final acid concn. (percent) | NCH recovered (percent) | Reduction time (min.) |
|---|---|---|---|---|---|---|---|
| 1 | 86 | 1 | 35 | 10 | 86 | 91 | 26 |
| 2 | 92 | 1 | 35 | 10 | 86 | 91 | 12 |
| 3 | 96 | 1 | 35 | 10 | 86 | 87 | 12 |
| 4 | 100 | 1 | 35 | 10 | 86 | 83 | 18 |
| 5 | 104 | 1 | 35 | 10 | 86 | 79 | 21 |
| 6 | 98 | 0.18 | 37 | 9.5 | 80 | 89 | 34 |
| 7 | 86 | 0.56 | 37 | 9.5 | 80 | 86 | 31 |
| 8 | 98 | 0.56 | 37 | 9.5 | 80 | 85 | 15 |
| 9 | 86 | 0.56 | 63 | 9.5 | 80 | 88 | 31 |
| 10 | 98 | 0.56 | 63 | 9.5 | 80 | 84 | 14 |
| 11 | 98 | 0.56 | 37 | 2.1 | 80 | 84 | 27 |
| 12 | 98 | 0.56 | 63 | 2.1 | 80 | 85 | 16 |
| 13 | 96 | 1 | 12 | 10 | 78 | 84 | 15 |
| 14 | 96 | 1 | 25 | 10 | 78 | 93 | 11 |
| 15 | 96 | 1 | 35 | 10 | 78 | 95 | 10 |
| 16 | 96 | 1 | 45 | 10 | 78 | 86 | 16 |
| 17 | 96 | 1 | 55 | 10 | 78 | 89 | 23 |
| 18 | 96 | 1 | 45 | 10 | 86 | 90 | 15 |
| 19 | 96 | 1 | 45 | 3 | 86 | 95 | 8 |
| 20 | 96 | 0.5 | 35 | 10 | 86 | 92 | 18 |
| 21 | 96 | 0.5 | 35 | 60 | 86 | 92 | 13 |
| 22 | 96 | 0.5 | 35 | 120 | 86 | 95 | 12 |
| 23 | 96 | 1 | 12 | 60 | 92 | 71 | 12 |
| 24 | 96 | 1 | 12 | 60 | 89 | 84 | 18 |
| 25 | 96 | 1 | 12 | 60 | 86 | 85 | 11 |
| 26 | 96 | 1 | 12 | 60 | 83 | 90 | 14 |
| 27 | 96 | 1 | 12 | 60 | 78 | 89 | 11 |

[1] NCH = Nitrocyclohexane.

*Example 3*

In each experiment below, 500 parts of a crude organic cyclohexane nitration product was subjected to the indicated sequence of treatments in a three-necked flask fitted with a thermometer, stirrer, and addition funnel. Stirring and cooling were used as needed, and during the last-mentioned of each sequence of treatments, sufficient water was added to effect stratification. The aqueous and organic phases then were separated by decantation, and the organic layer was washed successively with equal portions of water, 5% aqueous sodium carbonate solution, and water to remove traces of acid. The cyclohexane in the washed organic layer was removed through a 10-inch Vigreaux column under slight vacuum. In all three cases, part of the cyclohexane-free residue was hydrogenated under the previously described conditions, the reduction times being those noted in the table.

| Expt. No. | 28 | 29 | 30 |
|---|---|---|---|
| NCH[1] content of crude org. product (parts) | 160 | 123 | 123 |
| Treatment steps | (1) 125 parts 10% aq. NaOH/25° C./60 min. | (1) 123 parts 2% aq. NaOH/25° C./5 min. | (1) 123 parts 1% aq. NaOH/25° C./20 min. |
| | | (2) 125 parts H₂O/25° C./1 min. | |
| | (3) 88 parts 80% H₂SO₄/45° C./10 min. | (3) 128 parts 96% H₂SO₄/40° C./10 min. | |
| | (4) 168 parts 96% H₂SO₄/45° C./10 min. | (4) None | (4) None |
| NCH recovery (percent) | Not determined | 93 | 95 |
| Reduction time (min.) | 12 | 13 | 20 |

[1] NCH = Nitrocyclohexane.

Another portion of the cyclohexane-free residue from experiment 28 was distilled as in the foregoing examples and had a reduction time of 12 minutes, the same as that of the undistilled material. When the experiment 28 procedure was repeated except for the omission of the pretreatment with sodium hydroxide, the reduction time was 53 minutes without distillation and was 10 minutes with distillation.

By reference to the foregoing examples, it can be seen that the present process gives high yields of high-purity nitrocyclohexane suitable for reduction by catalytic hydrogenation and that the process is operable over a wide range of rather closely interrelated conditions. It is necessary that the impure nitrocyclohexane to be treated with the sulfuric acid be present in an organic solvent. Cyclohexane is the preferred nitrocyclohexane solvent inasmuch as it is present in the organic phase of the usual cyclohexane nitration products, and hence the organic cyclohexane nitration products per se may be subjected directly to the present purification process. Cyclohexane also has a boiling point (80.7° C.) which is below the nitrocyclohexane decomposition temperature and yet is sufficiently high that the present process can be operated at atmospheric pressure over a rather wide temperature range. However, as was intimated heretofore, it also is possible to remove the major portion of unreacted cyclohexane from the organic cyclohexane nitration product and thereafter to add one or more other nitrocyclohexane solvents which are essentially immiscible with sulfuric acid and also are chemically inert thereto under the conditions of the present process. Saturated hydrocarbons and hydrocarbon mixtures which are nitrocyclohexane solvents, which are liquid at ambient temperatures and pressures, and which boil above 65° C., preferably at about 80 to 160° C., at atmospheric pressure meet these requirements and also provide a satisfactorily wide temperature range in which the process may be operated safely and economically. For example, n-nonane has been used as the nitrocyclohexane solvent in the present process. The minimum amount of solvent preferably is about 0.5 part per part of the nitro compound. The proportion of solvent may, of course, exceed this level, but for reasons of economy and ease of handling, we prefer that the solvent-to-nitrocyclohexane weight ratio not exceed about 6/1.

The sulfuric acid used in the intimate contacting step should not contain more than 35% by weight, of the total, of water, i.e., should have a concentration of at least 65% by weight, for effective purification of the nitrocyclohexane. Anhydrous or even fuming sulfuric acids, e.g., 104.5% sulfuric acid, can be used but generally are less advantageous; compare experiments 1–5 of Example 2 in this respect. Sulfuric acid having an initial concentration of at least 85% and particularly of about 92 to 98% is preferable in the present process for the most efficient and effective purification. The amount of acid used should be at least sufficient to provide about 0.1 part of acid (100% basis) per part of nitrocyclohexane in the organic solution, and the other conditions being within the preferred ranges, the effectiveness of the purification generally increases as the sulfuric acid-to-nitrocyclohexane weight ratio approaches 1/1. Acid-to-nitro compound weight ratios above 1/1 also can be used in the purification without deleterious effects. However, because of economic considerations, an acid-to-nitrocyclohexane ratio not above about 2/1 generally is preferable.

The temperature used in the present purification process is limited only by the properties of the intimately contacted mass and its components. In other words, the process may be operated between the freezing temperature of the mass and the decomposition temperature of the nitrocyclohexane. However, to avoid the use of external cooling or pressure equipment, it is preferred to employ a temperature within the general range of 25° C. to the boiling point of the nitrocyclohexane solvent. When the other variables such as the initial sulfuric acid concentration and proportions are within the preferred ranges, a temperature of 25 to 65° C. is entirely satisfactory and may be preferable from an economic point of view.

The time during which the sulfuric acid and organic solution of crude nitrocyclohexane should be in intimate contact can vary over a wide range and, as will be apparent from the runs of the foregoing examples, is dependent on such factors as the contact temperature, the initial sulfuric acid concentration, and the ratio of acid to nitrocyclohexane in the solution being treated. The contact time also is dependent on the method of contacting the acid and the solution. For example, it is obvious that intimate contact of the acid and the organic solution will be achieved much more rapidly if the two components are used as finely divided streams rather than as bulk liquid streams. Depending generally on the other reaction variables, contact times ranging from a few seconds to about two hours give satisfactory results.

Reference to the examples, particularly the last five runs of Example 2, shows that for recovery of the purified nitrocyclohexane from the intimately contacted mass, the mass should contain some water. In general, the water concentration should be at least about 14 percent by weight of the total acid and water (based on the initial additions), and when the initial water concentration is less than this value, water dilution is used following the intimate contacting step. Dilution to a water concentration greater than about 35 percent of the total acid and water initially present does not improve recovery of the purified nitrocyclohexane and is generally undesirable. As has been demonstrated, any necessary dilution may be effected in the presence of the organic solvent phase, i.e., to effect re-extraction of the now-purified nitrocyclohexane from the acid into the organic phase. However, it also is possible to separate the organic and acid phases prior to the dilution step, particularly when the acid-to-nitrocyclohexane ratio is favorable to the dissolution of most or all of the impure nitrocyclohexane in the acid. In this embodiment, care must be taken to maintain the temperature below 80° C., inasmuch as concentrated solutions of nitrocyclohexane in concentrated sulfuric acid tend to be thermally unstable. This embodiment is particularly useful when organic nitration products are subjected to intimate contacting with sulfuric acid containing a maximum of 15% and preferably not more than about 8% of water. The purified nitrocyclohexane is then recovered directly on dilution, the necessity of removing the organic solvent being eliminated. Any impure nitrocyclohexane not carried over into the acid can, for example, be recycled with the cyclohexane to a nitration zone.

Prior to the intimate contacting with sulfuric acid, the organic solution of impure nitrocyclohexane can be subjected to a prepurification involving intimate contact with aqueous inorganic base. In general, we prefer to use aqueous sodium hydroxide containing from about 90 to 99 percent of water, particularly from 95 to 98 percent of water, based on the total base and water, in amounts to provide considerably less than an equivalent of the hydroxide, e.g., 0.03 to 0.25 mole per mole of the nitrocyclohexane. Such solutions do not cause any appreciable loss of nitrocyclohexane by formation of the relatively water-soluble salt of the aci-form.

Following the contact with the base, the entire contacted mass may be subjected to contact with sulfuric acid, as is shown in Example 3, or the mass may be allowed to stratify and only the organic phase subjected to the acid treatment. Example 3 additionally shows that when both the base treatment and the contact with sulfuric acid are used, the nitrocyclohexane recovered need not be fractionated prior to catalytic hydrogenation. However, treatment with base alone is not adequate, even when followed by fractionation, for purifying nitrocyclohexane to be used in this reduction.

The present invention has been described and illustrated in detail in the foregoing. However, many modifications and variations will be apparent to those skilled in the art. For example, the sulfuric acid treatment of the present purification procedure may be effected as a batch process or as a continuous procedure in which the solution of impure nitrocyclohexane in a suitable organic solvent, the sulfuric acid, and any water needed are fed as cocurrent or countercurrent streams to one or more mixing and settling zones. The treatment with aqueous inorganic base may be effected similarly and the total purification steps suitably integrated. The present purification procedures, whether effected continuously or batchwise, are also suitable for purifying other nitro cycloalkanes and nitro alkanes. Accordingly, we intend to be limited only by the following claims.

We claim:

1. In a process for the recovery of substantially pure nitrocyclohexane from impure nitrocyclohexane obtained as the crude reaction product from the controlled nitration of cyclohexane with a suitable nitrating agent, the essential step of working up the crude reaction product of said nitration by intimately contacting it in the presence of an organic solvent for nitrocyclohexane with sulfuric acid containing a maximum of about 35 percent by weight of water, based on the total weight of water and sulfuric acid, at a temperature between the freezing point of the intimately contacted mass and the decomposition temperature of nitrocyclohexane, the weight ratio of sulfuric acid on a 100% basis to nitrocyclohexane being at least about 0.1/1 and said organic solvent being chemically inert to and essentially immiscible with said sulfuric acid at said temperatures.

2. A process for the recovery of substantially pure nitrocyclohexane from impure nitrocyclohaxane obtained as the crude reaction product from the controlled nitration of cyclohexane with a suitable nitrating agent comprising intimately contacting the said crude nitration reaction product in the presence of an organic solvent for nitrocyclohexane with sulfuric acid containing a maximum of about 35 percent by weight of water, based on the total weight of water and sulfuric acid, at a temperature between the freezing point of the intimately contacted mass and the decomposition temperature of nitrocyclohexane, the weight ratio of sulfuric acid on a 100% basis to nitrocyclohexane being at least about 0.1/1 and said organic solvent being chemically inert to and essentially immiscible with said sulfuric acid at said temperatures; adjusting the water content of said intimately contacted mass to provide a total of from about 14 to about 35 percent by weight of water, based on the weight of water and sulfuric acid used in said intimate contacting; allowing said mass to stratify; separating the acidic and organic layers thus produced; and thereafter recovering purified nitrocyclohexane from said organic layer.

3. The process as claimed in claim 2, wherein the organic solvent for the nitrocyclohexane is cyclohexane.

4. The process as claimed in claim 2, wherein the temperature is from about 25 to about 80° C.

5. The process as claimed in claim 2, wherein sulfuric acid containing about 2 to about 15 percent by weight of water, based on the total weight of water and sulfuric acid, is used in said intimate contacting.

6. The process as claimed in claim 2, wherein the weight ratio of 100 percent sulfuric acid to nitrocyclohexane is from about 0.2/1 and about 2/1.

7. The process as claimed in claim 2, wherein the purified nitrocyclohexane is recovered from said organic layer by distillation.

8. The process as claimed in claim 2, wherein prior to the intimate contacting of the impure nitrocyclohexane with sulfuric acid in the presence of an organic solvent for nitrocyclohexane, the impure nitrocyclohexane is first subjected to the additional step of intimate contacting with aqueous alkali metal hydroxide containing from about 90 to about 99 percent by weight of water, based on the total weight of water and hydroxide, at a temperature from about 0 to 80° C., the mole ratio of alkali hydroxide to nitrocyclohexane being between about 0.03/1 and about 0.25/1.

9. A process for the recovery of substantially pure nitrocyclohexane from impure nitrocyclohexane obtained as the crude reaction product from the controlled nitration of cyclohexane with a suitable nitrating agent comprising intimately contacting the crude nitration reaction product in the presence of an organic solvent for nitrocyclohexane with sulfuric acid containing 2 to 8 percent by weight of water, based on the total weight of water and sulfuric acid, at a temperature of from 0 to 80° C., the weight ratio of sulfuric acid on a 100% basis to nitrocyclohexane being at least about 0.1/1 and said organic solvent being chemically inert to and essentially immiscible with said sulfuric acid at said temperatures; allowing said intimately contacted mass to stratify; separating the acidic and organic layers thus produced; adding to said acid layer the amount of water required to provide a total of from about 14 to about 35 percent by weight of water, based on the weight of water and sulfuric acid used in said intimate contacting; allowing the mass thus produced to stratify into a purified nitrocyclohexane layer and a second acidic layer; and thereafter separating said purified nitrocyclohexane layer from said second acidic layer.

10. A process for the recovery of substantially pure nitrocyclohexane from impure nitrocyclohexane obtained as the crude reaction product from the controlled nitration of cyclohexane with a suitable nitrating agent comprising intimately contacting the crude nitration reaction product with sulfuric acid containing 2 to 8 percent by weight of water, based on the total weight of water and sulfuric acid, at a temperature of from 25 to 65° C., the weight ratio of sulfuric acid on a 100% basis to nitrocyclohexane in said organic product being from 0.3/1 to 1.5/1; adjusting the water content of said intimately contacted mass to provide a total of from about 14 to about 35 percent by weight of water, based on the weight of water and sulfuric acid used in said intimate contacting; allowing said mass to stratify; separating the acidic and organic layers thus produced; and thereafter subjecting said organic layer to distillation to recover purified nitrocyclohexane.

References Cited in the file of this patent
UNITED STATES PATENTS

| | | |
|---|---|---|
| Re. 21,657 | Martin et al. | Dec. 10, 1940 |
| 2,822,393 | Nicolaisen et al. | Feb. 4, 1958 |
| 2,822,394 | Nicolaisen et al. | Feb. 4, 1958 |